United States Patent Office 3,538,033
Patented Nov. 3, 1970

3,538,033
POLYOXYALKYLENE DERIVATIVES OF DIEPOXIDES
Noburo Hayashi, Kyozaburo Tachibana, and Noboru Fujiwara, Wakayama-shi, Japan, assignors to Kao Soap Co., Ltd., Tokyo, Japan, a corporation of Japan
No Drawing. Filed Aug. 11, 1967, Ser. No. 659,863
Claims priority, application Japan, Aug. 19, 1966, 41/54,406
Int. Cl. C08g 23/10, 30/00
U.S. Cl. 260—29.2        12 Claims

ABSTRACT OF THE DISCLOSURE

New polyoxyalkylene compounds are provided having thickening properties and prepared by reacting a diepoxide compound with a member selected from the group consisting of a monohydric aliphatic alcohol, a monothiolic aliphatic mercaptan, an alkyl phenol and mixtures thereof, which member has at least 12 carbon atoms in all, and with which has been reacted an alklene oxide in a number of moles of not less than 20.

FIELD OF THE INVENTION

This invention relates to new polyoxyalkylene derivatives which possess an excellent thickening property and to the preparation of such polyoxyalkylene derivatives. These products are useful as a stable thickening agent for use in textile printing emulsions, cosmetic emulsions, aqueous pigment suspensions and any other emulsified or dispersed systems.

DESCRIPTION OF THE PRIOR ART

As thickening agents for aqueous solutions or emulsions or suspensions using water as a medium, there are known various cellulose derivatives, for example, water-soluble polymers, such as sodium polyacrylates and polyacrylamides, and polyethylene glycol fatty acid diesters. Among them, polyethylene glycol fatty acid diesters have excellent qualities, for example, the hand after drying is good and the solubility in water is high compared with other known thickening agents. They are therefore widely used as thickening agents for textile printing emulsions, cosmetic emulsions and aqueous pigment suspensions. But, the polyethylene glycol fatty acid diesters have the defect that they are apt to be hydrolyzed in an acid or alkaline liquid so that their thickening effect is gradually reduced.

Accordingly, it is an object of the present invention to provide new thickening agents in which the above mentioned advantages of polyethylene glycol fatty acid diesters are retained and the disadvantage of their hydrolyzability is minimized.

Another object is the preparation of new polyoxyalkylene derivatives suitable for use as thickening agents.

Other objects and advantages of this invention will further become apparent in the following description and in the appended claims.

SUMMARY OF THE INVENTION

These objects are accomplished in accordance with the present invention by reacting the alkylene oxide adduct of an organic compound selected from the group consisting of monohydric aliphatic alcohols, monothiolic aliphatic mercaptans and alkyl phenols, which compound has at least 12 carbon atoms in all, and at least 20 moles of alkylene oxide and reacting the adduct with a diepoxide compound in the presence of an alkaline catalyst.

The above alkylene oxide adduct contains 20 to 300 moles of alkylene oxide units selected from the group consisting of ethylene oxide units alone and mixtures of not less than 80% by weight ethylene oxide units and not more than 20% by weight propylene oxide at random or in a block.

Organic compounds from which the above alkylene oxide adducts are derived can be aromatic and they include, for example; alkyl phenols such as octyl phenol, nonyl phenol, dodecyl phenol, diamyl phenol, dioctyl phenol and dinonyl phenol; monohydric aliphatic alcohols such as dodecyl, tridecyl, hexadecyl, octadecyl and octadecenyl alcohols and abiethyl alcohol; monothiolic aliphatic mercaptans such as dodecyl or octadecyl mercaptan. Mixtures of these organic compounds can be also used. These organic compounds should have at least 12 carbon atoms.

The examples of diepoxy compounds which are useful in the present invention include 2,2-bis[p-($\beta,\gamma$-epoxypropoxy)phenyl]propane (usually called as bisphenol A - epichlorohydrin precondensate), 1 - epoxyethyl-3,4-epoxycyclohexane (usually called as vinylcyclohexene diepoxide) and alpha-limonene diepoxide. Said vinylcyclohexene diepoxide can be obtained by reacting vinylcyclohexene and peracid in the presence of an acid catalyst. Also, $\alpha$-limonene diepoxide can be obtained by reacting $\alpha$-limonene and peracid in the presence of an acid catalyst.

DETAILED DESCRIPTION OF THE INVENTION

The diepoxide compound is most preferably reacted with an alkylene oxide adduct containing from 100 to 250 moles of ethylene oxide units and the organic compound is most preferably selected from the group consisting of aliphatic monohydric alcohols, aliphatic monomercaptans and alkyl phenols having from 12 to 18 carbon atoms, and more particularly 16 to 18 carbon atoms, in the presence of an alkaline catalyst at a reaction temperature of 50° to 200° C., most preferably 100° to 150° C., for a suitable time from 10 minutes to 10 hours.

The reaction between the alkylene oxide adduct and the diepoxide compound will proceed easily, and its aqueous solution viscosity will gradually rise as the reaction continues. The point at which the viscosity reaches the maximum value and rises no more is the end point of the reaction according to this invention.

If the number of carbon atoms of the monohydric aliphatic alcohol, monothiolic aliphatic mercaptan or alkyl phenol with which the alkylene oxide is to be reacted in the present invention is too small (less than 12), the aqueous solution of the reaction product will be too low in viscosity to be used as a thickening agent. By increasing the number of carbon atoms to be not less than 12 as mentioned above, a product adapted to the object of the present invention will be obtained. If the number of mols of the alkylene oxide is too small (less than 20), the product obtained by reacting with the diepoxide will become water-insoluble and not suitable as a thickening agent for aqueous materials. It is therefore necessary to achieve water-solubility of the product by utilizing at least 20 mols of alkylene oxide units.

Further, the increase of the number of mols of the alkylene oxide can reduce the amount of the diepoxide to be reacted with the alkylene oxide adduct and is economically advantageous.

The diepoxide compound to be used in the present invention acts as a coupler. Its reaction ratio with the alkylene oxide adduct will be usually selected within the range of 0.5 to 5 equivalents of epoxide per equivalent of the hydroxyl value of the alkylene oxide adduct. However, the optimum amount of the use of the diepoxide is different depending on the kind of the active hydrogen compound to be reacted with the alkylene oxide, the molecular weight of the alkylene oxide adduct and the kind of the diepoxide. If the amount of the use of the diepoxide is made too small, the thickening effect will be low and, if the amount is made too large, the product will become water-insoluble.

The aqueous solution of the reaction product of the present invention has generally a high degree of viscosity though more or less different depending on the kinds of the raw material substances used in the production and the ratio of them to each other. Further, it will not decompose in conditions of acidity or alkalinity and hence retain the thickening action. Therefore, it can be used as a thickening agent for pigment containing aqueous liquids, such as textile printing emulsions, cosmetic emulsions and aqueous pigment suspensions prepared by mixing various ingredients as is known in the art.

In the process of this invention the alkaline catalysts used are those that are conventional in epoxide condensations e.g. caustic potash or caustic soda.

EXAMPLE 1

5522 g. of ethylene oxide (226 mols of ethylene oxide) were reacted with 150 g. of octadecyl alcohol in the presence of 7.7 g. of caustic potash at a reaction temperature of 150° to 160° C. The hydroxyl value of the reaction product was 9.2. A series was made of 1.7 to 3.9 g. of Epicoat 828 (trade name of a bisphenol A-epichlorohydrin precondensate of an epoxy equivalent of 188, manufactured by Shell Oil Company) and same were added to 100 g. of said reaction product and the solution was stirred at 150° C. for 3 hours. The apparent viscosity of the aqueous solution as measured with a rotary viscosimeter was much higher than before the reaction as is disclosed in the following table.

Amount of Epicoat 828 used:

| | Viscosity in centipoises at 40° C. of 10% aqueous solution |
|---|---|
| 1.7 g. (0.55 equivalent) | 350. |
| 2.8 g. (0.91 equivalent) | 12,000. |
| 3.9 g. (1.26 equivalents) | Insoluble in water. |

The viscosity of the aqueous solution of the ethylene oxide adduct before the reaction with Epicoat 828 was only 12 centipoises at 40° C. in 10% aqueous solution.

EXAMPLE 2

A series was made of 1.4 to 6.4 g. of Chissonox 206 (trade name of a vinyl cyclohexene diepoxide of an epoxy equivalent of 76, manufactured by Chisso Company, Ltd., Japan) and same were added to 100 g. of the ethylene oxide adduct in Example 1 and the solution was stirred at 150° C. for 3 hours. The viscosity of its aqueous solution as measured was much higher than before the reaction as is disclosed in the following table.

Amount of Chissonox 206 used:

| | Viscosity in centipoises at 40° C. in 10% aqueous solution |
|---|---|
| 1.4 g. (1.12 equivalents) | 650. |
| 1.7 g. (1.36 equivalents) | 2,440. |
| 3.2 g. (2.57 equivalents) | 18,500. |
| 4.5 g. (3.61 equivalents) | 45,000. |
| 6.4 g. (5.13 equivalents) | Insoluble in water. |

EXAMPLE 3

An adduct was made by reacting 2200 g. of gaseous ethylene oxide (50 mols of ethylene oxide) with 186 g. of lauryl alcohol in the presence of 11.2 g. of caustic potash at a temperature of 150° to 160° C. The hydroxyl value of the reaction product was 34.4. The reaction product was neutralized with 11.5 g. of glacial acetic acid and was filtered. Caustic potash (0.24 g.) was added to 70 g. of this product, the product was dehydrated at 100° C. under 30 mm. Hg and then 12 g. (3.7 equivalents) of Chissonox 206 was added. The product was stirred at 120° to 150° C. for 6 hours. The viscosity of the aqueous solution of the reaction product was 370 centipoises at 25° C. at a concentration of 10%. The viscosity of the aqueous solution of the ethylene oxide adduct was only 30 centipoises under the same conditions.

EXAMPLE 4

An adduct was made by reacting 5370 g. of ethylene oxide (220 mols of ethylene oxide) with 150 g. of octadecyl alcohol in the presence of 6.2 g. of caustic potash at a reaction temperature of 120° to 160° C. The hydroxyl value of the reaction product was 7.3. To 100 g. of this reaction product was added 4.4 g. (4.0 equivalents) of Chissonox 269 (trade named of α-limonene diepoxide of 85 epoxy equivalents manufactured by Chisso Company, Ltd.). The product was stirred at 110 to 180° C. for 9 hours. The viscosity of the aqueous solution of the reaction product was 3000 centipoises at 40° C. at a concentration of 20%. The viscosity of the aqueous solution of the starting ethylene oxide adduct was only 20 centipoises under the same conditions.

EXAMPLE 5

An adduct was made by reacting 1540 g. of ethylene oxide (111 mols of ethylene oxide) with 112 g. of Abitol (trade name of a product of Hercules Powder Company consisting of tetrahydroabietyl alcohol, dihydroabietyl alcohol and dehydroabietyl alcohol) (of a hydroxyl value of 157.7) in the presence of 4.4 g. of caustic potash at 150° to 160° C. The hydroxyl value of the product was 14.2. To 100 g. of this reaction product was added 7.1 g. (3.7 equivalents) of Chissonox 206. The product was stirred at 110° to 170° C. for 3 hours. The viscosity of the aqueous solution of the reaction product was shown to be 4400 centipoises at 40° C. at a concentration of 10%. The viscosity of the aqueous solution of the starting ethylene oxide adduct was only 7 centipoises under the same conditions.

EXAMPLE 6

An adduct was made by reacting 3350 g. of ethylene oxide (101 mols of ethylene oxide) with 150 g. of dodecyl mercaptan in the presence of 12.5 g. of caustic potash at 150° to 160° C. The hydroxyl value of the product was 22.1. To 100 g. of this reaction product was added 6.6 g. (2.2 equivalents) of Chissonox 206. The product was stirred at 120° to 150° C. for 6 hours. The viscosity of the aqueous solution of the reaction product was shown to be 600 centipoises at 28° C. at a concentration of 3%. The viscosity of the aqueous solution of the starting ethylene oxide adduct was only 30 centipoises under the same conditions.

EXAMPLE 7

An adduct was made by reacting 5450 g. of ethylene oxide (258 mols of ethylene oxide) with 137 g. of octadecyl mercaptan in the presence of 8.4 g. of caustic potash at 150° to 160° C. The hydroxyl value of the product was 13.9. To 100 g. of this reaction product was added 4.2 g. (2.24 equivalents) of Chissonox 206. The product was stirred at 110° to 130° C. for 1 hour. The viscosity of the aqueous solution of the reaction product was 8000 centipoises at 40° C. at a concentration of 20%. The viscosity of the aqueous solution of the starting ethylene oxide adduct was only 15 centipoises under the same conditions.

EXAMPLE 8

An adduct was made by reacting 5180 g. of a mixed vapor of ethylene oxide and propylene oxide at a weight ratio of 10:1 (230 mols of the alkylene oxide) with 110 g. of nonyl phenol in the presence of 7 g. of caustic potash at 130° to 150° C. The hydroxyl value of the reaction product was 11.0. To 100 g. of this product was added 3.3 g. (2.22 equivalents) of Chissonox 206. The product was stirred at 140° to 150° C. for 3 hours. The viscosity of the aqueous solution of the reaction product was 475 centipoises at 30° C. at a concentration of 25%. The viscosity of the aqueous solution of the starting alkylene oxide adduct was only 67 centipoises under the same conditions.

EXAMPLE 9

An adduct was made by reacting 880 g. of ethylene oxide (40 mols of ethylene oxide) with 181 g. of industrial dinonyl phenol (of a hydroxy value of 155) containing mono and trinonyl phenols in the presence of 2.8 g. of caustic potash at 150° to 160° C. The hydroxyl value of the product was 46.1. To 70 g. of this product was added 8.0 g. (1.8 equivalents) of Chissonox 206. The product was stirred at 120° to 150° C. for 3 hours. The viscosity of the aqueous solution of the reaction product was shown to be 8100 centipoises at 40° C. at a concentration of 20%. The viscosity of the aqueous solution of the starting ethylene oxide adduct was only 9 centipoises under the same conditions.

EXAMPLE 10

An adduct was made by reacting 880 g. of ethylene oxide (20 mols of ethylene oxide) with 261 g. of sperm alcohol (of an iodine value of 62 and a hydroxyl value of 215) in the presence of 1.3 g. of caustic soda at 150° to 160° C. The reaction product was neutralized with 1.6 g. of glacial acetic acid and was filtered. The hydroxyl value of the product was 59. To 100 g. of the above mentioned reaction product was added 0.39 g. of caustic potash. The product was dehydrated at 100° C. under 30 mm. Hg for 1 hour and 9.7 g. (1.2 equivalents) of Chissonox 206 were then added thereto. The product was stirred at 120° to 150° C. for 3 hours. The viscosity of the aqueous solution of the reaction product was shown to be 2500 centipoises at 40° C. at a concentration of 15%. The viscosity of the aqueous solution of the starting ethylene oxide adduct was only 14 centipoises under the same conditions.

EXAMPLE 11

The stability of the viscosity with the pH of the aqueous solution of the thickening agent according to the present invention was compared with that of the conventionally used stearic acid diester of a polyethylene glycol (of a molecular weight of 6000).

The sample according to the present invention was the reaction product in Example 2 in which 1.7 g. of Chissonox 206 was used. For the viscosity of the aqueous solution was measured its apparent viscosity with a rotary viscosimeter.

METHOD OF PREPARING THE TEST SAMPLES

With buffer solutions having the pH adjusted to be 2, 7 and 11, there were prepared 10% aqueous solutions in the case of the reaction product in Example 2 and of 5% in the case of the polyethylene glycol distearate. The viscosity is shown by the values in centipoises (cps.) at 40° C. The results of the tests were as in the following table.

TABLE 1

| pH | Reaction product in Example 2 | | Polyethylene glycol distearate | |
|---|---|---|---|---|
| | Just after preparation (cps.) | In 7 days at 50° C. (cps.) | Just after preparation (cps.) | In 7 days at 50° C. (cps.) |
| 2 | 2,250 | 1,600 | 1,113 | 18 |
| 7 | 2,640 | 2,680 | 1,500 | 1,463 |
| 11 | 2,800 | 2,800 | 2,290 | 925 |

This table shows that, even when the thickening agent according to the present invention was used in an acid or alkaline aqueous solution, its viscosity was very stable.

EXAMPLE 12

An adduct was made by condensing 5522 g. of ethylene oxide with 150 g. of octadecyl alcohol in the presence of 717 g. of caustic potash at a reaction temperature of 150° to 160° C.

The hydroxyl value of the condensation product was 9.2.

To 100 g. of this condensate was added 2.8 g. (0.91 equivalent) of Epicoat 828, and the condensate was stirred at a reaction temperature of 150° C. for 3 hours. The viscosity at 40° C. of the aqueous solution of 9% of the reaction product as measured with a rotary viscosimeter was 9600 centipoises. This is much higher than the viscosity of 11 centipoises at 40° C. of the 9% aqueous solution of the starting material ethylene oxide adduct.

Then 2.8% of this reaction product, 2.2% polyoxyethylene nonyl phenyl ether (10 mols of ethylene oxide), 0.9% of an additive, 50% mineral terpene and 44.1% water (45% water in case there was no additive) were made into an emulsion with a homogenizing mixer. As a control, in the case of the polyethylene glycol distearate, 1.6% polyethylene glycol distearate, 1.3% polyoxyethylene nonyl phenyl ether (10 mols of ethylene oxide), 0.9% of an additive, 50% mineral terpene and 46.2% water (47.1% water in case there was no additive) were made into an emulsion with a homogenizing mixer. The variation of the viscosity of the emulsion with the lapse of days (as measured at 40° C. with a rotary viscosimeter) was as follows:

TABLE II

| Additives | Reaction product in Example 12 | | Polyethylene glycol distearate | |
|---|---|---|---|---|
| | Just after preparation (cps.) | In 7 days at 30° C. (cps.) | Just after preparation (cps.) | In 7 days at 30° C. (cps.) |
| None | Not less than 100,000 | Not less than 100,000 | 51,000 | 34,000 |
| 28% ammonia | do | do | 45,000 | 27,500 |
| Stannous chloride | do | 47,000 | 32,000 | 1,500 |
| Longalit [1] | do | Not less than 100,000 | 56,000 | 36,000 |

[1] Trade name of a formaldehyde adduct of sodium thiosulfate manufactured by Daiichi Pharmaceutical Company, Ltd.

As shown in the above table, the viscosity of the mineral terpene emulsion containing the thickening agent of the present invention compared to the same emulsion containing the conventional thickening agent was more stable than the conventional high quality thickening agents.

EXAMPLE 13

An adduct was made by reacting 200 mols of ethylene oxide with one mol of Kalcohl 86 (trade name of a product of Kao Soap Co., Ltd., Japan, consisting of stearyl alcohol and cetyl alcohol and of a hydroxyl value of 200) in the presence of an alkaline catalyst. To 85 g. of this polyethylene-glycol alkyl ether (hydroxy value: 8.4; alkali value: 0.35 mg. KOH/g.) was added 2.4 g. of Chissonox 206 (trade name of vinylcyclohexene diepoxide of 76 epoxy equivalents manufactured by Chisso Company Ltd., Japan). The mixture was reacted at 140° C. for 3 hours and neutralized with acetic acid.

A textile printing emulsion was prepared as follows:

1 g. of the above reaction product and 2 g. of polyethylene-glycol phenyl ether (11 mols of ethylene oxide) were added to 67 g. of water and the mixture was stirred at 11,000 r.p.m. with a homogenizing mixer and 130 g. of mineral terpene was added in small portions to this stirred mixture during 20 minutes. After adding said mineral terpene the stirring was further continued for 10 minutes, obtaining an emulsion.

Said emulsion has an apparent viscosity of 30,000 centipoises at 40° C. as measured with a rotary viscosimeter. 75 g. of said emulsion, 20 g. of an emulsion of acrylic acid ethyl ester-methyl acrylamide copolymer (40% solids) and 5 g. of 50% phthalocyanine blue dispersion were mixed and the mixture was printed on a cotton broadcloth by hand printing. The printed cloth was dried under room temperature and heat-treated at 110° C. for 5 minutes. The obtained printed cloth had a high colour value and showed an excellent hand after washing by water.

EXAMPLE 14

The oil phase and water phase having the following compositions were prepared respectively.

|  | Composition I, percent | Composition II, percent |
|---|---|---|
| Oil phase: |  |  |
| Stearic acid | 7.0 | 7.0 |
| Lanolin | 0.5 | 0.5 |
| Sorbitan monooleate | 0.5 | 0.5 |
| Polyoxyethylene sorbitan monostearate | 2.5 | 2.5 |
| Water phase: |  |  |
| Water | 79.5 | 79.5 |
| Sorbitol (70% aq. sol.) | 10 | 10 |
| Thickening agent obtained in Example 2 (3.61 equivalents) |  | 0.2 |
| Total, percent by weight | 100.0 |  |

The above oil phase and water phase were used in such amounts that the total amount of both phases was 200 g.

In preparing emulsions from these oil and water phases, the water phase was placed in a 500 cc. beaker and stirred at 11,000 r.p.m. with a homogenizing mixer (Homomixer), the oil phase was added thereto during 3 minutes and the mixture was further stirred for 5 minutes. Nonionic O/W (oil in water) emulsions were obtained. The state of emulsion and viscosity of these emulsions having the above Compositions I and II were as follows:

|  | Composition I | Composition II |
|---|---|---|
| State of emulsion | Unstable liquid emulsion. | Stable paste emulsion having a fine texture. |
| Viscosity (25° C.) | 17 cps | 180 cps. |

The emulsion having the above Composition II showed a good flowing property suitable as a lotion base.

The embodiments of the invention in which an exclusive property or privilege is claimed are defined as follows:

1. New polyoxyalkylene compounds having thickening properties and prepared by reacting a compound having two vicinal epoxy groups with a member selected from the group consisting of monohydric aliphatic alcohols, monothiolic aliphatic mercaptans, and alkyl phenols and mixtures thereof, which member has at least 12 carbon atoms in all, and with which has been reacted an alkylene oxide in a number of moles of not less than 20.

2. New polyoxyalkylene compounds in accordance with claim 1 comprising an alkaline-catalyzed reaction product of (a) an adduct of 20 to 300 mols of an alkylene oxide containing not less than 80% by weight of ethylene oxide and not more than 20% by weight of propylene oxide with an organic compound having at least 12 carbon atoms and selected from the group consisting of monohydric aliphatic alcohols, monothiolic aliphatic mercaptans, alkyl phenols, and mixtures thereof of with (b) a di-(vicinal)-epoxide selected from the group consisting of 2,2 - bis[p - (β,γ - epoxypropoxy)phenyl]propane, 1-epoxyethyl-3,4-epoxycyclohexane and alpha-limonene diepoxide.

3. New polyoxyalkylene compounds in accordance with claim 1 comprising an alkaline catalyzed reaction product of (a) an adduct of 100 to 250 moles of ethylene oxide with an aliphatic monohydric alcohol of from 12 to 18 carbon atoms with (b) a quantity of 2,2-bis[p-(β,γ-epoxypropoxy)phenyl]propane sufficient to provide an epoxy equivalent of 0.5 to 5 times the hydroxyl value of said adduct.

4. New polyoxyalkylene compounds in accordance with claim 1 comprising an alkaline catalyzed reaction product of (a) an adduct of 100 to 250 moles of ethylene oxide with a monothiolic aliphatic mercaptan of from 12 to 18 carbon atoms with (b) a quantity of 1-epoxyethyl-3,4-epoxycyclohexane sufficient to provide an epoxy equivalent of 0.5 to 5 times the hydroxyl value of said adduct.

5. New polyoxyalkylene compounds in accordance with claim 1 comprising an alkaline catalyzed reaction product of (a) an adduct of 100 to 250 moles of ethylene oxide with an aliphatic monohydric alcohol of from 12 to 18 carbon atoms with (b) a quantity of 1-epoxyethyl-3,4-epoxycyclohexane sufficient to provide an epoxy equivalent of 0.5 to 5 times the hydroxyl value of said adduct.

6. New polyoxyalkylene compounds in accordance with claim 1 comprising an alkaline catalyzed reaction product of (a) an adduct of 100 to 250 moles of ethylene oxide with an alkyl phenol of from 12 to 18 carbon atoms with (b) a quantity of 1-epoxyethyl-3,4-epoxycyclohexane sufficient to provide an epoxy equivalent of 0.5 to 5 times the hydroxyl value of said adduct.

7. The process comprising reacting in the presence of an alkaline catalyst (a) an adduct of 20 to 300 moles of an alkylene oxide containing not less than 80% by weight of ethylene oxide and not more than 20% by weight of propylene oxide with an organic compound having at least 12 carbon atoms and selected from the group consisting of monohydric aliphatic alcohols, monothiolic aliphatic mercaptans, alkyl phenols, and mixtures thereof with (b) a coupling compound selected from the group of di-(vicinal)-epoxides consisting of 2,2-bis[p-(β, γ - epoxypropoxy)phenyl]propane, 1 - epoxyethyl - 3,4-epoxycyclohexane and alpha-limonene diepoxide, said diepoxide having an epoxy equivalent of 50 to 200, and carrying out the reatcion at a temperature of 50° to 200° C. for a period of time sufficient to effect a coupling between said adduct and said coupling compound, as evidenced by increased viscosity of the product, and stopping the reaction when the viscosity becomes a constant maximum value.

8. Process according to claim 7 wherein the adduct is that of ethylene oxide and an aliphatic monohydric alcohol of from 16 to 18 carbon atoms and the coupling compound is 2,2-bis[p-(β,γ-epoxypropoxy)phenyl]propane.

9. Process according to claim 7 wherein the adduct is that of ethylene oxide and a monothiolic aliphatic mercaptan and the coupling compound is 1-epoxyethyl-3,4-epoxycyclohexane.

10. Process according to claim 7 wherein the adduct is that of ethylene oxide and an aliphatic monohydric alcohol of from 16 to 18 carbon atoms and the coupling compound is 1-epoxyethyl-3,4-epoxycyclohexane.

11. Process according to claim 7 wherein the adduct is that of ethylene oxide and an alkyl phenol of from 16 to 18 carbon atoms and the coupling compound is 1-epoxyethyl-3,4-epoxycyclohexane.

12. A stable aqueous emulsion containing a pigment and a thickening agent comprising the product of claim 2.

References Cited

UNITED STATES PATENTS

| 2,996,551 | 8/1961 | De Groote et al. | 260—615 |
| 3,102,893 | 9/1963 | Gaertner | 260—615 |
| 3,424,817 | 1/1969 | Hicks | 260—834 |
| 3,374,286 | 3/1968 | Hicks | 260—834 |

WILLIAM H. SHORT, Primary Examiner

E. A. NIELSEN, Assistant Examiner

U.S. Cl. X.R.

260—2, 47, 348, 609, 613, 615, 830